United States Patent
Hansen et al.

(10) Patent No.: US 10,040,712 B2
(45) Date of Patent: Aug. 7, 2018

(54) PROCESS AND APPARATUS FOR MAKING A MINERAL MELT

(75) Inventors: Peter Farkas Binderup Hansen, Birerod (DK); Lars Elmekilde Hansen, Roskilde (DK); Lars Bollund, Slangerup (DK); Lars Kresten Hansen, Roskilde (DK)

(73) Assignee: ROCKWOOL INTERNATIONAL A/S (DK)

( * ) Notice: Subject to any disclaimer, the term of this patent is extended or adjusted under 35 U.S.C. 154(b) by 561 days.

(21) Appl. No.: 12/934,378

(22) PCT Filed: Mar. 26, 2009

(86) PCT No.: PCT/EP2009/002209
§ 371 (c)(1),
(2), (4) Date: Jan. 28, 2011

(87) PCT Pub. No.: WO2009/118180
PCT Pub. Date: Oct. 1, 2009

(65) Prior Publication Data
US 2011/0179829 A1    Jul. 28, 2011

(30) Foreign Application Priority Data

Mar. 27, 2008   (EP) .................................. 08005839

(51) Int. Cl.
*C03B 3/02* (2006.01)
*C03B 5/12* (2006.01)
*F23C 3/00* (2006.01)

(52) U.S. Cl.
CPC ................ *C03B 5/12* (2013.01); *C03B 3/023* (2013.01); *C03B 3/026* (2013.01); *F23C 3/008* (2013.01); *Y02P 40/58* (2015.11)

(58) Field of Classification Search
CPC .................................................. C03B 3/023
(Continued)

(56) References Cited

U.S. PATENT DOCUMENTS 3,855,951 A   12/1974 Giles
4,135,904 A    1/1979 Suzuki et al.
(Continued)

FOREIGN PATENT DOCUMENTS

EP            1 889 816 A1   2/2008
WO     WO-2003/002469 A1   1/2003
WO     WO-2008/019780 A1   2/2008

OTHER PUBLICATIONS

Journal Article entitled "Pyroflux Process Glass Production Economic Estimates", *Bol. Soc. Esp. Ceram. Vidr.*, vol. 31, No. 3, May 1, 1992, pp. 256-257, XP000296434.
(Continued)

*Primary Examiner* — John M Hoffmann
(74) *Attorney, Agent, or Firm* — Tarolli, Sundheim, Covell & Tummino LLP

(57) ABSTRACT

The present invention relates to an apparatus and a method of making a mineral melt, the method comprising the steps of providing a circulating combustion chamber (1); injecting fuel, preheated mineral material and combustion gas into the circulating combustion chamber (1); combusting the fuel in the circulating combustion chamber (1) thereby melting the mineral material to form a mineral melt and generating exhaust gases; separating the exhaust gases from the mineral melt, collecting the mineral melt (9) and passing the exhaust gases (10) to a heat exchange system, the method being characterised in that the mineral material comprises a first mineral material and a second mineral material wherein the first mineral material has a higher sintering temperature than the second mineral material and the first and second mineral materials are provided separately to the heat exchange system, wherein the first mineral material is preheated through contact with the exhaust gases and subsequently the (Continued)

second mineral material is preheated through contact with the exhaust gases and the preheated first mineral material.

11 Claims, 2 Drawing Sheets

(58) Field of Classification Search
USPC .......................................................... 65/482
See application file for complete search history.

(56) References Cited

U.S. PATENT DOCUMENTS

| | | |
|---|---|---|
| 4,544,394 A | 10/1985 | Hnat |
| 4,553,997 A | 11/1985 | Hnat |
| 4,957,527 A | 9/1990 | Hnat |
| 5,006,141 A | 4/1991 | Chen et al. |
| 5,114,122 A | 5/1992 | Hnat |
| 5,494,863 A | 2/1996 | Mathur |

OTHER PUBLICATIONS

Tang et al., "Application of Pure Oxygen with Batch Preheating to Glass-Melting Furnaces", *Ceramic Bulletin*, vol. 69, No. 11, Jan. 1, 1990, pp. 1827-1830, XP000255740.

PROCESS AND APPARATUS FOR MAKING A MINERAL MELT

FIELD OF THE INVENTION

The present invention relates to the production of a mineral melt by burning combustible material in the presence of inorganic particulate material and thereby forming a melt. The invention is of particular use for recycling waste mineral materials. The melt can then be fiberised to form mineral fibres or used in other industrial processes.

BACKGROUND TO THE INVENTION

Traditionally, the normal way of producing a melt for slag, stone or rock fibres has been by means of a shaft furnace in which a self-supporting stack of inorganic particulate material is heated by combustion of combustible material in the furnace. The stack gradually melts and is replenished from the top, with melt draining down the stack and out from the bottom of the furnace. The normal furnace for this purpose is a cupola furnace.

It is necessary for the stack to be self-supporting and permeable to the combustion gases, which are generally generated by combustion of carbonaceous material in the stack. It is therefore necessary that everything in the stack is relatively coarse (in order that the stack is permeable) and has high physical strength and does not collapse until combustion or melting is well advanced. In practice this means that the carbonaceous material is coke and the particulate material is either coarsely crushed rock, stone or slag.

If fine particles of mineral material such as waste mineral wool are used it is necessary to incur the expense and inconvenience of forming it into briquettes. Briquetting usually uses sulphur-containing materials as binder, such as Portland cement with gypsum, and this means that the effluent is liable to have a high sulphur content, which has to be treated.

The cupola or other stack furnace system also has the disadvantage that conditions in the furnace always tend to be sufficiently reducing that some of the iron is reduced to metallic iron. This necessitates separating metallic iron from the melt, reduces wool production, leads to the provision of iron waste and also tends to incur the risk of corrosion in the section containing iron and slag.

Another disadvantage is that the process does not have high thermal efficiency.

Despite these disadvantages, the process using a cupola or other stack furnace has been widely adopted throughout the world for the manufacture of rock, stone or slag fibres.

An alternative and entirely different system for the production of a mineral melt that avoids or reduces the disadvantages of the cupola system is disclosed in our earlier publication WO 03/002469. This system involves suspending powdered coal, or other fuel, in preheated combustion air and combusting the suspended fuel in the presence of suspended particulate mineral material in a circulating combustion chamber, i.e., a combustion chamber in which the suspended particulate materials and air circulate in a system which is or approaches a cyclone circulation system. This is commonly referred to as a cyclone furnace.

The suspension of coal in preheated air, and the particulate mineral material, are introduced through the top or close to the top of the combustion chamber. Within the combustion chamber, combustion of the particulate coal occurs and the particulate material is converted to melt. The melt and particulate material that is not yet melted is thrown onto the walls of the chamber by the circulating gases and will flow down the chamber. The melt is collected in a settling tank at the bottom of the chamber.

In order to increase the energy efficiency of the cyclone furnace in WO03/002469, the exhaust gases, which leave the circulating chamber at a temperature in the range of 1400 to 1700° C., are used to preheat the particulate material. WO 03/002469 teaches that the exhaust gases are quenched to 1000 to 1500° C. and then mixed with the mineral material to preheat it to a temperature of 700 to 1050° C.

EP-A-1889876 and WO 2008/019780 also disclose a cyclone system.

The cyclone furnace has significant advantages compared to cupola or other stack furnaces. With respect to fuel, it avoids the need for briquetting fine particles and a wide range of fuels can be used including, for example, plastic. Using a melting cyclone furnace eliminates the risk of reduction of the ores to iron and releases exhaust gases which are environmentally acceptable. The flexibility in melt capacity is much better than with a cupola furnace meaning that production can easily and quickly be switched, from, for example, 40% to 100% of total capacity so the time taken to respond to changing demands is greatly reduced. Furthermore, melting in a cyclone furnace is much quicker than is the case for a cupola furnace and is in the order of minutes, rather than in the order of hours.

Hence, using a melting cyclone furnace system is economically and environmentally desirable and the system disclosed in WO 03/002469 works well. There is, however, room for improvement in the process.

In WO 03/002469 the mineral material preferably includes an unspecified proportion of waste bonded mineral wool. It is generally beneficial to be able to recycle a waste material. However, the inventors have discovered that when bonded mineral wool is used in the system of WO 03/002469 there is a tendency for the mineral material to lose its free-flowing particulate characteristics and become sticky. This is particularly the case when a significant amount of waste mineral wool is used, such as 5% or more of the total mineral material.

The loss of free-flowing characteristics of the mineral material impedes the efficient flow of the mineral material and the gases in the heat exchange system and can even lead to this becoming blocked. It also reduces the efficiency of the combustion in the circulating combustion chamber as more energy is required to melt large mineral material agglomerates than is required to melt more finely divided particles.

The object of the present invention is to provide a method of making mineral wool which can be used to recycle waste mineral material while maintaining the flow properties of the mineral material and achieving a high level of energy efficiency.

U.S. Pat. No. 5,006,141 describes a method for production of glass using combustion heat to melt glass making material in a glass making furnace. The furnace used is not a circulating combustion chamber furnace. Two feedstocks are used to produce the melt, one being a batch feedstock and one being glass cullet. The cullet is preheated before the batch feedstock. There is no teaching that the batch feedstock has lower sintering temperature than the cullet. The cullet is preheated to about 650° C. (1200° F.) and the batch feedstock is preheated to a temperature of about 250° C. (about 490° F.).

SUMMARY OF THE INVENTION

According to a first aspect, the present invention provides a method of making a mineral melt, the method comprising the steps of:

providing a circulating combustion chamber;

injecting fuel, preheated mineral material and combustion gas into the circulating combustion chamber;

combusting the fuel in the circulating combustion chamber thereby melting the mineral material to form a mineral melt and generating exhaust gases;

separating the exhaust gases from the mineral melt, collecting the mineral melt and passing the exhaust gases to a heat exchange system;

wherein the mineral material comprises a first mineral material and a second mineral material wherein the first mineral material has a higher sintering temperature than the second mineral material; the method being characterised in that the first and second mineral materials are provided separately to the heat exchange system, the first mineral material is preheated through contact with the exhaust gases and subsequently the second mineral material is preheated through contact with the exhaust gases and the preheated first mineral material.

According to a second aspect, the present invention provides apparatus suitable for conducting a method according to the first aspect of the invention, comprising a circulating combustion chamber which has a fuel inlet, a mixed mineral material inlet and a combustion gas inlet, means for collecting a mineral melt, and a heat exchange system comprising a first cyclone preheater, a first conduit from the circulating combustion chamber to the first cyclone preheater for transporting exhaust gases, a first mineral material conduit for transporting the first mineral material to the first conduit, a second mineral material inlet for injecting the second mineral material into the first conduit at a point which is further away from the circulating combustion chamber than the outlet of the first mineral material conduit, and a mixed mineral material conduit from the first cyclone preheater to the mixed mineral material inlet in the circulating combustion chamber.

According to a third aspect, the present invention relates to a method of making a mineral melt, the method comprising the steps of:

providing a circulating combustion chamber;

injecting fuel, preheated mineral material and combustion gas into the circulating combustion chamber;

combusting the fuel in the circulating combustion chamber thereby melting the mineral material to form a mineral melt and generating exhaust gases;

separating the exhaust gases from the mineral melt, collecting the mineral melt and passing the exhaust gases to a heat exchange system;

wherein the mineral material comprises a first mineral material which is a raw mineral material and a second mineral material which is bonded mineral wool; the method being characterised in that the first and second mineral materials are provided separately to the heat exchange system, the first mineral material is preheated through contact with the exhaust gases and subsequently the second mineral material is preheated through contact with the exhaust gases and the preheated first mineral material.

In the invention it is essential that the mineral material includes two types of mineral material, first mineral material and second mineral material. In the first aspect, it is essential that the first mineral material has a higher sintering temperature than the second mineral material. Typically, the first mineral material is 'raw' or unprocessed and the second mineral material is processed. According to the third aspect of the invention, it is essential that the first mineral material is a raw mineral material, and the second mineral material is bonded mineral wool.

Processed mineral material such as mineral fibres commonly have amorphous structures and include additives such as organic or inorganic binders. Both of these characteristics generally lead to a lower sintering temperature than raw mineral materials which are typically in crystalline form.

Processed mineral material can be, for example, mineral wool that either does not meet the requirements for which it has been processed, that is surplus to requirements or that has been used, for example as building insulation. Such material is usually discarded.

In the present invention, processed mineral material can be recycled, which relieves the serious problem of land fill and the saved energy and reduction in pollution contributes to reducing climate change.

In WO 03/002469 limited amounts of processed mineral material, such as bonded mineral fibres, have been used in a process for making mineral wool and have been preheated as part of a mixture with raw mineral materials. However, due to the lower sintering temperature of processed mineral materials compared to raw mineral materials, the processed mineral materials have a tendency to soften or melt on contact with the exhaust gases and become sticky thereby compromising the free-flowing properties of the whole amount of mineral material and leading to the many problems mentioned above.

The sintering temperature of a mineral material is the temperature at which particles of the mineral material begin to coalesce and lose their free-flowing properties. Hence, this problem exists whenever two types of mineral materials which have different sintering temperatures are used.

One approach to avoid compromising the free-flowing properties of the mineral material would be to quench the exhaust gases to a large extent to below the sintering temperature of the lowest softening mineral material. However, the quenching process inevitably results in a loss of heat energy so this reduces energy efficiency of the system. To obtain high energy efficiency in the system it is important to utilise the heat energy in the exhaust gases to the greatest extent possible. In addition, this would severely limit the maximum temperature obtainable for the preheated mineral material as this would be well below the temperature of the quenched exhaust gas.

The present invention solves these problems by providing the first mineral material separately from the second mineral material and by carrying out the preheating in two stages. The first stage is preheating of the first mineral material by contacting it with the exhaust gases. The second stage involves preheating the second mineral material with the exhaust gases and with the preheated first mineral material.

Hence, by the time the exhaust gases reach the second mineral material they have already been quenched (i.e. cooled) by their contact with the first mineral material. In this way, exhaust gases can be used for preheating the first mineral material at a higher temperature than is possible when first and second mineral materials are mixed, while avoiding softening or melting of the mineral material which adversely affects the free-flowing characteristics.

By heating the mineral material in stages based on the sintering temperature, it is also possible to preheat the mineral material to a higher overall temperature (while avoiding melting or softening) than is possible when the mineral material is preheated in one stage. This is because exhaust gases of a higher temperature can be used in the first stage to preheat the first mineral material so the total heat energy that can be transferred to the mineral material as a whole is higher than if the second and first mineral materials were preheated together.

It is an advantage of the present invention that high levels of mineral materials with a lower than usual sintering temperature, such as processed mineral materials, can be recycled in an energy efficient manner. In the most preferred embodiment between 25 and 50% of the total mineral material is second mineral material.

The use of the invention to recycle processed mineral materials does not affect the quality of the melt which is typically high. In a preferred embodiment, the melt is used to make mineral fibres.

The heat exchange system preferably comprises a first cyclone preheater to which the exhaust gases are transported from the circulating combustion chamber through a first conduit. It is preferred that both types of mineral materials are introduced into the exhaust gases in the heat exchange system before the preheater cyclone, with the first mineral material being introduced into the exhaust gases before the second mineral material.

To improve the energy efficiency further, it is preferred that the first mineral material is initially heated in a second cyclone preheater prior to being introduced into the exhaust gases from the circulating combustion chamber in the first conduit.

DETAILED DESCRIPTION OF THE INVENTION

The circulating combustion chamber in the present invention is of the type which is frequently referred to as a cyclone furnace. The construction of suitable cyclone furnaces is described in various patents including U.S. Pat. Nos. 3,855,951, 4,135,904, 4,553,997, 4,544,394, 4,957,527, 5,114,122 and 5,494,863.

The chamber is generally a vertical rather than a horizontal furnace. It normally has a cylindrical top section into which the fuel, mineral material and combustion gas are injected, a frustoconical bottom section and a base section in which the melt can be collected. Alternatively the chamber can be wholly cylindrical. The base section is preferably an integral part of the chamber and can be simply the end part of the frustoconical bottom region or can be a cylindrical section at the end of the bottom region. Preferably the diameter of the base section is not larger than the diameter of the top section in contrast to traditional systems which often employ a tank at the base of the chamber of enhanced volume.

The base section has an outlet for the mineral melt through which the melt passes as a stream. This stream can then be subjected to fiberisation in any conventional manner, for instance using a cascade spinner or a spinning cup or any other conventional centrifugal fiberising process. Alternatively, the mineral melt can be used in other industrial processes.

It is preferred that, at the point at which the outlet for mineral melt leaves the base section of the chamber, it does not immediately extend down but, instead, the outlet is a siphon. By "a siphon" we mean that the outlet, which is usually a tube or guttering, initially has an upward orientation relative to the opening in the chamber and subsequently has a downward orientation before leading to the fiberising equipment. This is advantageous for the melt quality as any unburnt fuel particles on the surface of the melt are kept inside the chamber.

Fuel is injected into the circulating combustion chamber. Any combustible fuel can be used. The fuel can be gaseous at room temperature, such as butane, propane, methane or natural gas, but is preferably a liquid or solid material. The fuel is preferably in particulate form and is most preferably a particulate carbonaceous material.

Where the fuel is a liquid, it is used in the form of droplets, i.e., particles of liquid fuel. In this embodiment, the fuel can be particles of petroleum oil or other carbon based liquids.

However, the particulate fuel in the present invention is preferably solid. It is generally a carbonaceous material and can be any particulate carbonaceous material that has a suitable calorific value. The calorific value can be relatively low, for instance as low as 10000 kJ/kg or even as low as 5000 kJ/kg. Thus it may be, for instance, dried sewage sludge or paper waste. Preferably it has higher calorific value and may be spent pot liner from the aluminium industry, coal containing waste such as coal tailings, or powdered coal.

In a preferred embodiment, the fuel is powdered coal and may be coal fines but preferably some, and usually at least 50% and preferably at least 80% and usually all of the coal is made by milling lump coal, for instance using a ball mill. The coal, whether it is supplied initially as fines or lump, may be good quality coal or may be waste coal containing a high inorganic content, for instance 5 to 50% inorganic with the balance being carbon. Preferably the coal is mainly or wholly good quality coal for instance bituminous or sub-bituminous coal (ASTM D388 1984) and contains volatiles which promote ignition.

The fuel particles preferably have a particle size in the range from 50 to 1000 µm, preferably about 50 to 200 µm. Generally at least 90% of the particles (by weight) are in this range. The average is generally about 70 µm average size, with the range being 90% below 100 µm.

The fuel can be fed into the chamber through a feed pipe in a conventional manner to give a stream of fuel particles. This normally involves the use of a carrier gas in which the fuel particles are suspended. The carrier gas can be air, oxygen-enriched air or pure oxygen (preferably at ambient temperature to avoid flashbacks) or a less reactive gas such as nitrogen. The carrier gas is considered to be part of the combustion gas.

At least some and preferably the majority of the fuel is injected into the top section of the circulating combustion chamber. However, in preferred embodiments some fuel, termed secondary fuel, is also injected in to the bottom section of the circulating combustion chamber as discussed below.

In the present invention preheated mineral material is injected into the circulating combustion chamber. It is essential that two types of mineral materials, first and second mineral materials, are used. In the first aspect of the invention, it is essential that the first mineral material has a sintering temperature higher than the second mineral material. This is also the case in the third aspect of the invention where the first mineral material is a raw mineral material and the second mineral material is bonded mineral wool.

The sintering temperature of the mineral materials can be measured by any suitable method, of which many are used in the art. It is not vital which method for measuring sintering temperature is used, provided that the same method is used for both the mineral materials. This is because what is important in the invention is that mineral materials which have different sintering temperatures are separated, so it is most important to be able to determine accurately the relative rather than absolute sintering temperatures.

One method that can be used is as follows: A test sample is mounted in a tube reactor mounted with a sintered plate. The reactor could be steel or quartz. The reactor is placed in an electrically heated tubular oven which can be heated up to temperatures exceeding 900° C. A raw material test sample sufficient to form a 20 mm thick layer is placed on the sintered plate of the tube reactor which is subsequently mounted into the preheated electrically heated tube oven. The oven is heated to temperatures in the range of 800-1000° C. A gas flow is passed through the sintered plate and the test material and the pressure drop over the sintered plate and the test material is measured as the temperature of the electrical furnace is gradually increased. As the temperature increases the test sample or part of it will approach the initial sintering temperature and as this temperature is exceeded the particles will start to agglomerate which may be seen as an increase in the pressure drop over the test sample. The sintering temperature corresponds to the temperature at which an increase in pressure drop is detected.

The first and second mineral materials may both be made up from a mixture of materials that do not have exactly the same chemical composition or chemical structure and consequently do not have the same sintering temperature. What is important is the temperature at which the mineral materials lose their free-flowing properties. Therefore, once any of the material has softened the material as a whole is said to have reached its sintering temperature. The first mineral material has a sintering temperature that is usually at least 30° C. higher than the second mineral material, preferably at least 50, 100 or 200° C. or even at least 400 or 500° C. higher than the second mineral material.

Mineral materials are obtained from the earth and are often called rock, stone or slag. The first mineral material is usually a 'raw' mineral material. By raw mineral materials is meant mineral materials that have not been processed in the way that could significantly change their chemical composition or internal structure and have not undergone a melting process. Raw mineral materials generally have a crystalline structure, do not comprise organic addictives and are typically derived directly from the earth. Raw mineral materials are used in the invention in particulate form and have undergone crushing and/or grinding to obtain particles.

The second mineral material can be a raw mineral material that has a lower sintering temperature than the first mineral material. However, preferably it is a processed material. By processed mineral materials is meant mineral materials that have either undergone processing that will alter the chemical composition or structure or have been treated with additives such as organic binders.

Treating mineral material, for example melting it and processing it into mineral fibres, is known to change the chemical structure of the materials. In detail, raw mineral materials typically have a crystalline structure as noted above, whereas processed mineral materials, such as mineral fibres, typically have an amorphous structure. It is thought that the melting process causes the chemical structure of the mineral material to change from crystalline to amorphous. The chemical structure of materials affects their physical characteristics such as sintering temperature and melting point and in general materials in crystalline form have a higher sintering temperature than materials in amorphous form with the same composition. Hence, it is possible for the second mineral material to have exactly the same composition as the first mineral material but to have a lower sintering temperature, due to the fact that it is a processed mineral material in amorphous form rather than a raw mineral material in crystalline form.

Commonly, the second mineral material will be a mineral material that has been processed and is in amorphous form, and may also comprises additives that lower the sintering temperature of the material. A typical processed mineral material is bonded mineral fibres otherwise known as mineral wool.

The first and second mineral materials are both preferably in particulate form. The mineral materials can have any suitable particle size. For example the first mineral material generally has a particle size of 2 to 3 mm, particularly when is it a raw mineral material. The second mineral material typically have a particle size of 100 to 500 μm. The mineral materials are crushed or/and subjected to grinding to obtain the defined particle size. It is preferred that both the first and second mineral material are of the type that are suitable for making mineral fibres, which can be glass fibres or rock, stone or slag fibres. Preferably the mineral materials are suitable for making rock, stone or slag fibres.

Glass fibres typically have a chemical analysis, by weight of oxides, of above 10% $Na_2O+K_2O$, below 3% iron as FeO, below 20% CaO+MgO, above 50% $SiO_2$ and below 5% $Al_2O_3$. Rock, stone or slag fibres typically have an analysis, by weight of oxides, of below 10% $Na_2O+K_2O$, above 20% CaO+MgO above 3% iron as FeO, and below 50% $SiO_2$ and, often, above 10% $Al_2O_3$. Fibres of the rock, stone or slag type, having this composition, are preferred as the end product of the method of the invention.

In the invention it is essential that the mineral material is preheated prior to being injected into the circulating combustion chamber. This preheating is discussed below.

The preheated mineral material, which is melted in the chamber to produce the mineral melt, is introduced into the top section of the chamber so that it becomes suspended in the gases therein. The point at which the preheated mineral material is added is not critical and it can be mixed with the fuel and injected through the fuel feed pipe. It is, however, preferable to add the particulate mineral material into the burning fuel. This can be achieved by adding the particulate mineral material into the chamber though an inlet in a conventional way, for example at or near to the top of the chamber.

Combustion gas is also introduced into the top section of the chamber and can be at ambient temperature or can be preheated. When the gas is heated, the maximum desirable temperature that the primary combustion gas is pre-heated to is around 600° C., and the preferred preheating is to between 300 and 600° C., most preferably to around 500 to 550° C. The combustion gas can be air or can be oxygen enriched air. By "oxygen-enriched air" we mean that the gas contains more oxygen than is naturally present in air and can, in addition, contain other gases that are naturally present in air. It can also contain other gases that are not normally present in air, such as propane or methane, providing the total level of oxygen remains over that normally present in air.

In the preferred embodiment the combustion gas is oxygen-enriched air which comprises at least 25% or 35%, preferably at least 50%, most preferably at least 70% oxygen by volume or pure oxygen. Throughout the description and claims by "pure oxygen" we mean oxygen of 92% purity or more obtained by, eg. the vacuum pressure swing absorption technique (VPSA) or it may be almost 100% pure oxygen obtained by a distillation method. Using oxygen-enriched air is advantageous as it reduces the total volume of combustion gas needed. This means that a smaller circulating combustion chamber can be used than when air is used. As both the size of the chamber and the volume of the combustion gas are correlated with the energy needed to produce mineral fibres and the subsequent energy loss, the present invention results in systems with higher energy efficiency. This has significant benefits in terms of increased economic viability and reduced environmental impact. In one embodiment, to optimise energy savings associated with the use of oxygen, with the increased cost of oxygen compared to air, the air comprises 25 to 50% oxygen. Where pure oxygen is used it is preferably at ambient temperature, rather than being preheated.

The combustion gas may be introduced through a feed pipe with the fuel suspended in it, especially when the gas is at a relatively low temperature. The fuel should not begin to combust in the fuel pipe before it enters the chamber (a phenomenon known as "flash back") so low gas temperatures are needed in this embodiment. However, the combustion gas is preferably introduced separately through one or more combustion gas inlets which can be located in the vicinity of the fuel feed pipe so that the combustion gas is directed into the chamber in the same region as the fuel, to allow for efficient mixing.

Whether or not they are introduced together, the speed at which the combustion gas is injected into the chamber is relatively low (preferably between 1 and 50 m/s), so as to minimise wear of the apparatus. When the fuel and mineral material are suspended in the combustion gas, the speed is preferably between 5 and 40 m/s. When they are introduced separately, which is preferred, the injection speed of the fuel is preferably 20 to 40 m/s.

It is desirable to ensure that the preheated fuel is mixed rapidly and thoroughly with the combustion gas as this ensures that the fuel is ignited rapidly so that it can undergo pyrolysis, the initial stage of burning, almost immediately after introduction into the chamber. Having thorough mixing also ensures that the residence time of the fuel particles in the primary combustion gas is more uniform thereby leading to more efficient fuel combustion.

To help ensure rapid and thorough mixing in one embodiment of the invention an additional gas can be introduced in the top section of the circulating combustion chamber which travels at a higher speed than the combustion gas and the particulate fuel and, due to the speed differential, causes turbulence of the stream of fuel particles thereby breaking up the stream and ensuring rapid mixing. The additional gas is generally much less voluminous than the combustion gas and typically makes up less than 40% of the total gas injected into the combustion chamber, preferably between 10 and 30%. The additional gas can be any gas including air, nitrogen, oxygen, or a flammable gas such as propane or butane. The additional gas may be injected from an inlet so that it is adjacent the stream of fuel particles in the chamber but is preferably injected to an inlet that concentrically surrounds the fuel inlet. This concentric arrangement leads to efficient mixing, particularly where the additional gas inlet has a converging nozzle at its opening. The additional gas is preferably travelling at least 100 m/s faster than the fuel and the combustion gas, usually at least 250 m/s, preferably at least 300 m/s. In the most preferred embodiment, the injection speed of the additional gas is sonic, i.e, at or above the speed of sound.

In addition to the combustion gas that is injected into the top section of the circulatory combustion chamber, it is preferably to also inject some combustion gas into the bottom section. This can be termed secondary combustion gas. As with the main combustion gas, the secondary combustion gas can be at ambient temperature or preheated and preferably contains at least 25% oxygen. Preferably the secondary combustion gas is oxygen enriched air which comprises at least 30% or 35%, preferably at least 50%, most preferably at least 70% oxygen by volume, or between 30 and 50% oxygen or pure oxygen. The secondary combustion gas can be introduced in any conventional manner but is preferably introduced using an inlet which has a converging nozzle, otherwise known as a lance.

The secondary combustion gas can be injected from one inlet in the lower section but is preferably injected from at least two, most preferably more than two such as three, four, five or six, preferably four inlets.

The inventors have found that adding combustion gas in the bottom section of the circulating combustion chamber is very effective at ensuring full burn-out of the fuel particles. Adding oxygen at this point has been found to be much more effective than simply adding additional oxygen with the primary combustion air in the upper section. The secondary combustion gas makes up less than half of the total combustion gas which includes the main combustion gas, secondary combustion gas and any additional gas that is introduced which is combustible. Preferably, the secondary combustion gas makes up between 10 to 50%, preferably 20 to 40% of the total percentage of combustion gas.

In a preferred embodiment, an additional (or secondary) solid, liquid or gaseous fuel is injected into the bottom section, and burns in the presence of the secondary combustion gas to form a flame in the bottom section. This is particularly important when oxygen-enriched air is used as the combustion gas as although the lower volumes needed advantageous increase energy efficiency. The relative amounts of the oxygen in the secondary combustion gas and the secondary fuel are selected so that there is an excess of oxygen following complete combustion of the secondary fuel in the secondary gas.

Injecting secondary fuel into the bottom section is advantageous as it can be used to regulate the temperature of the melt which has collected in the base section. Forming a flame in the bottom section in addition to the main combustion in the top section is advantageous as it is a mechanism by which the melt temperature can be changed. In particular, in the base section of the circulating combustion chamber the mineral melt flows down the walls to be collected in the base section. Hence, in this region the melt is present as a thin film on the walls of the chamber and as a bath in the base section, which is normally shallow. Applying radiant heat in this area is particularly effective as it can penetrate the whole of the melt easily. Therefore, using a flame in this region is particularly effective at heating the melt homogeneously, rapidly and within accurate parameters so by varying the flow rate of the fuel and gas in this region, the temperature of the melt can be maintained within precise limits.

As this is the purpose, the secondary fuel is preferably injected towards the lower end of the bottom section, preferably in the lower half of the frustoconical bottom section of the chamber, so that it is close to the base section. The secondary fuel can be any fuel. In one embodiment the secondary fuel comprises solely solid fuel like particulate carbonaceous materials such as coal as these are generally very cost effective and can reduce the production of $NO_x$. In another embodiment the secondary fuel includes some liquid or gaseous fuel that combusts immediately and completely. Preferably the secondary fuel includes some solid fuel, such as coal, in amounts such as 10 to 90%, preferably 50 to 90%, most preferably 70 to 90% of the total secondary fuel, where the remainder of the secondary fuel is liquid or gaseous fuel. Preferred non-solid fuels are propane, methane or natural gas. The secondary fuel is present in a lower amount than the particulate fuel and makes up less than 40%, typically 5 to 15% of the total fuel energy.

In this embodiment the secondary combustion gas is preferably pure oxygen and is introduced through a burner inlet with the fuel so that combustion occurs immediately. Alternatively, the secondary combustion gas can be introduced through an inlet close to the inlet for the secondary fuel and mixing can take place in the chamber.

The general motion of gases and suspended particulate material in the circulating combustion chamber is a cyclone motion. This is created by introduction of the combustion gas, as well as particulate fuel and mineral material, at an appropriate angle to sustain the swirling motion. When used, the secondary combustion gas is also preferably introduced in the same direction so as to sustain the circulating currents.

The exhaust gases become separated from the mineral melt which is collected in the base of the chamber, and are passed to a heat exchange system, usually via a flue in the top of the circulating combustion chamber. The exhaust gases are then used to preheat the mineral material and optionally also the combustion gas. The exhaust gases typically leave the circulating combustion chamber at a temperature of between 1300 and 1900° C., usually 1500 to 1750° C. such as around 1550 to 1650° C.

In the present invention it is essential that the first and second mineral materials are provided separately to the heat exchange system. As discussed above, it is essential that the first mineral material has a higher sintering temperature than the second mineral material. The first mineral material is typically a raw mineral material with a sintering temperature of 1200 to 1400° C. whereas the second mineral material is typically a processed mineral material, such as bonded mineral fibres, which have a sintering temperature of 900 to 1100° C.

To achieve maximum energy efficiency it is very important that the heat energy of the exhaust gases is utilised as fully as possible. It is also important for heat efficiency and to maintain good flow characteristics of the mineral material and hence good process efficiency that the mineral materials are not melted or softened during the preheating. The present invention provides a method which deals with both of these considerations by preheating the first mineral material prior to the second mineral material. In particular, the first mineral material is added to the heat exchange system prior to the second mineral material. By this is meant that the first mineral material is added upstream in the exhaust gases of the second mineral material. After contact with the first mineral material, the first mineral material is preheated and the exhaust gases are cooled and go on with the preheated first mineral material to preheat the second mineral material.

It is usual to quench the exhaust gases before contact with the first mineral material. Typically the exhaust gases are quenched to around 1400° C. to avoid softening or melting the first mineral material. The quenching is carried out with any suitable gas such as air or any suitable liquid such as ammonia.

When the exhaust gases contact the first mineral material they preheat it and are themselves cooled. In a first preheating stage the first mineral material is preferably preheated to a temperature of from 300 to 600° C., more preferably 400 to 500° C. Preferably the relative amounts of exhaust gases and first mineral material are such that the first mineral material is preheated by the end of the second preheating stage to slightly below the sintering temperature of the second mineral material, usually 850 to 950° C.

The second mineral material is subsequently added to the heat exchange system and contacts the exhaust gases and first mineral material which is suspended in the exhaust gases. The second mineral material is preheated through this contact. Preferably the second mineral material is preheated to at least 700° C., more preferably at least 800° C. and most preferably between 850 and 950° C.

Often the second mineral material is a processed product which includes organic agents such as organic binders. It is particularly advantageous to preheat the second mineral material to a temperature at which and conditions under which the organic additives are completely combusted.

If the second mineral material is bonded mineral wool it should be preheated to at least 600 to 800° C. for at least 1 to 2 seconds under atmospheric conditions which contain at least 2% oxygen to burn off the organic binder.

The heat exchange system preferably comprises at least one and preferably two or even three preheater cyclones. The first and second mineral materials are typically added to a first conduit which transports exhaust gases from the circulating combustion chamber to the first cyclone preheater. In the first cyclone preheater, the exhaust gases are separated from the mineral material. The mineral material, which comprises the first and second mineral materials mixed, is passed through a mixed mineral material conduit to the circulating combustion chamber to be melted.

Preferably nitrogen oxide (NOx) reducing conditions are generated in the first cyclone preheater. NOx is an environmental effluent that must be removed from the exhaust gases before they can be released into the atmosphere. This is normally carried out by selective non-catalytic reduction (SNCR). However, advantageously in the present invention NOx can be significantly reduced and preferably substantially eliminated in the first cyclone preheater by selective non-catalytic reduction (SNCR). This is an economic and convenient way to remove NOx from the exhaust gases.

The NOx reducing conditions are generated by including in the cyclone preheater nitrogenous material which will reduce NOx under the conditions prevailing in the preheater. The nitrogenous material may be included in the hot exhaust gas which is fed to the preheater or may be added direct to the preheater.

The nitrogenous material which is included in the preheater cyclone is preferably ammonia or ammonium compound, an amine or urea, wherein the urea may be free or, more preferably, is a resinous product such as a urea formaldehyde or phenol urea formaldehyde resin. It is particularly preferred that the NOx reducing conditions are generated by including in the mineral material bonded mineral wool as the second mineral material which is fed to the preheater cyclone, wherein the waste bonded mineral wool contains a urea resin (usually phenol urea resin) and/or ammonia or an ammonium compound (for instance as a buffering agent for resin in the waste wool). Thus, by the invention, it is possible simultaneously to utilise waste material and to react it under appropriate conditions so as to reduce a significant amount of the NOx in the exhaust gases to nitrogen.

The amount of ammonia or ammonia derivative or other NOx-reducing compound is preferably 1 to 4 (preferably 1-2 or, especially, 1-1.7) moles per mole NOx and the reaction is preferably conducted at a temperature of 800° C. to 1050° C. The reaction residence time is preferably at least 0.3 seconds and most preferably at least 1 second. Typically this can be the residence time of the particulate mineral material in the cyclone preheater, and/or the ducting, until the exhaust gas is cooled below reaction temperature, e.g., below 800° C. Under these conditions, preferably with a temperature in the range 800 to 1050° C., substantially all the NOx is reduced to nitrogen, even though the atmosphere in the preheater is preferably oxidising.

Thus, according to another preferred feature of the invention the gaseous atmosphere in the cyclone preheater contains excess oxygen, preferably in an amount of at least 1% or 2% and most preferably at least 4%, for instance up to 8% by volume by weight of the gaseous atmosphere. Despite the oxidising nature of the atmosphere, NOx is reduced by the added ammonia or other nitrogenous compound under the conditions defined for the preheater.

The preheater can thus simultaneously operate as a NOx reducer and an oxidising after-burner to burn pollutants such as hydrogen sulphide and carbon monoxide from the circulating combustion chamber.

Preferably the exhaust gases which are separated from the melt and which are then fed to the cyclone preheater contain less oxygen than the amount which is present in the cyclone preheater and so preferably air or other source of oxygen is added to the exhaust gases either in the preheater or between the melt and the preheater.

The exhaust gases are passed from the top of the first cyclone preheater through a second conduit to a second cyclone preheater. It is preferred that the first mineral material undergoes initial preheating in the second cyclone preheater before being conveyed to the first conduit to be further preheated by the exhaust gases. Hence, in a preferred embodiment the first mineral material is introduced into the second conduit and is preheated to an initial temperature of between 300 and 600° C., preferably to between 450 and 500° C. The exhaust gases then leave the second cyclone preheater and are often used to heat the combustion gas by indirect heat exchange.

DESCRIPTION OF THE FIGURES

FIG. 1 shows a circulating combustion chamber 1 which comprises a cylindrical top section, a frustoconical bottom section and a cylindrical base section. Particulate fuel is introduced into the circulating combustion chamber from supply 2 and is preferably coal. Preheated mineral material is introduced into the circulating combustion chamber via a mixed mineral material conduit 3. The coal and mineral material are introduced together with combustion air via conduit 4 and secondary air which is provided in compressed air supply 5 and is introduced through a lance (not shown) into the circulating combustion chamber to ensure thorough mixing of the coal with the combustion air and to sustain the circulating motion of the combustion gases and suspended material in the circulating combustion chamber 1. A minor amount of combustion gas and fuel are diverted from the main feed which leads to the top section of the circulating combustion chamber, to the bottom section of the circulating combustion chamber via routes which are shown in FIG. 1 as 6 and 7 respectively. Secondary fuel, in this case natural gas is also injected through supply 8 into the base section of the circulating combustion chamber shown in FIG. 1 as 8.

Figure 1:
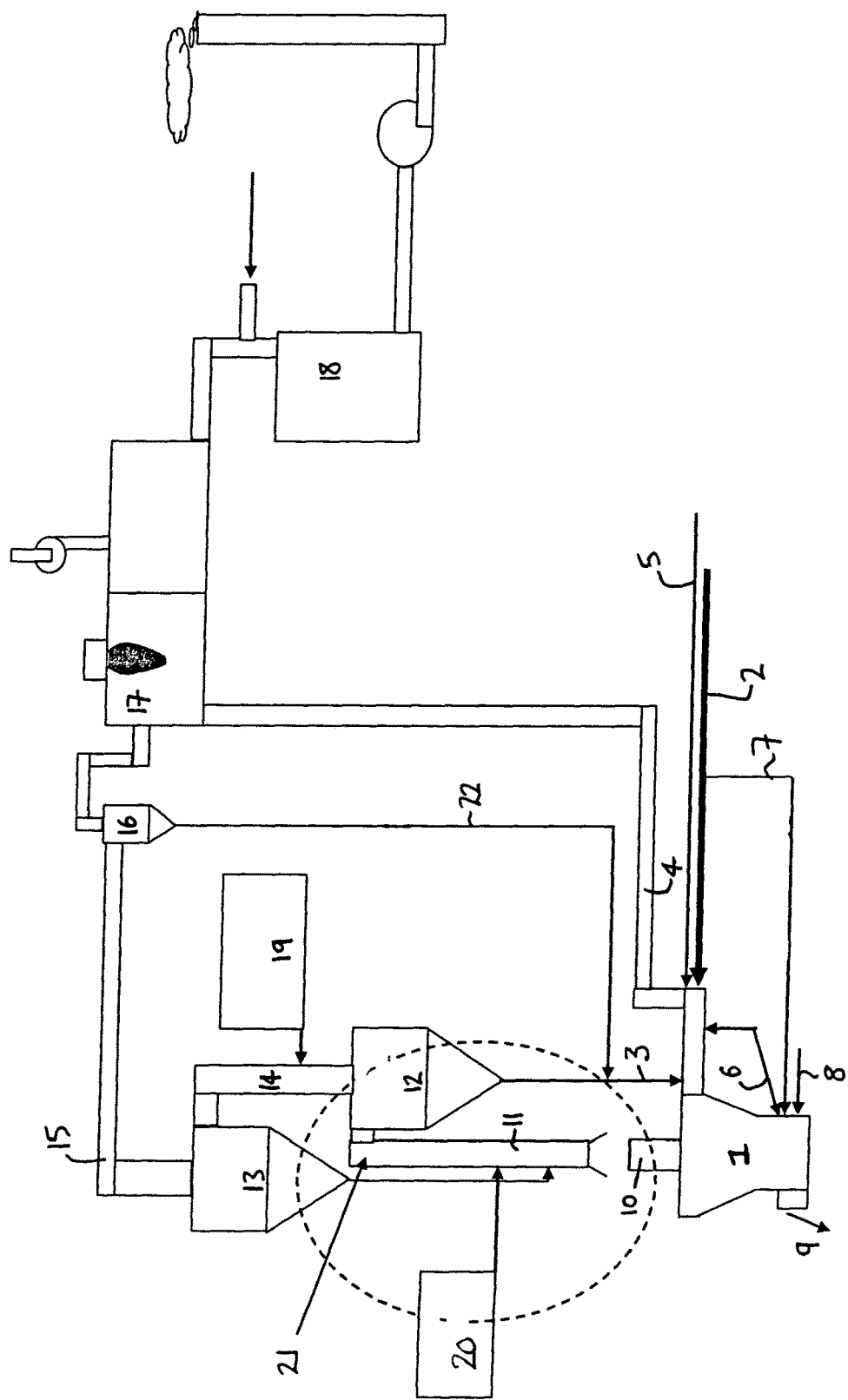
FIG. 1 is an illustration of apparatus which is suitable for use in a preferred embodiment of the present invention.

The coal is combusted in the combustion gas, which is preferably oxygen-enriched air, in the circulating combustion chamber. The resultant melt is collected in the base zone of the circulating combustion chamber 1 and exits the chamber via outlet 9. The exhaust gases are fed through flue 10 at the top of the circulating combustion chamber to the first conduit 11 where they are used to heat the first and second mineral materials. The exhaust gases then flow to a first cyclone preheater 12 where they are separated from the first and second mineral materials which are at this point mixed together. The exhaust gases flow from the first cyclone preheater 12 to the second cyclone preheater 13 via a second conduit 14. Following the second cyclone preheater 13 the exhaust gases flow through conduit 15 to a dust cyclone 16 and into a chamber 17 where indirect heat exchange with the combustion gas occurs to preheat the combustion gas. The exhaust gases are then treated to make them safe to pass to the atmosphere such as by filter 18.

The mineral materials are preheated prior to being added to the circulating combustion chamber. In detail, the first mineral material which is typically a raw stone material is supplied from silo 19 to second conduit 14 and undergoes initial preheating in second preheater cyclone 13. The first mineral material is then passed through first mineral material conduit and introduced into first conduit 11 and subsequently passes to the first preheater cyclone. The second mineral material is provided from silo 20 to the first conduit downstream of the first mineral material. The second mineral material is generally a processed mineral material typically bonded mineral fibres. To ensure that NOx reducing conditions are generated in the first preheater cyclone 12, nitrogenous materials such as ammonia can be added at position 21 into the first conduit 11 immediately before the first preheater cyclone 12.

Some of the first mineral materials may be carried up with the exhaust gases from the second cyclone preheater 13 through conduit 15. These are separated from the exhaust gases in dust cyclone 16 and recycled back to join the preheated mineral materials via conduit 22.

Figure 2:
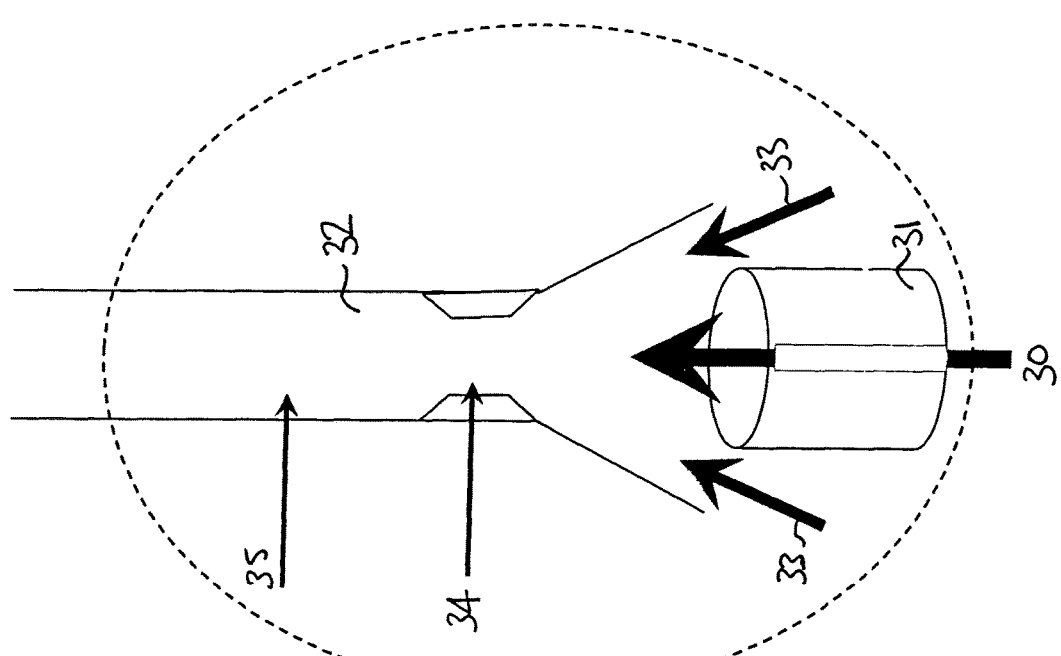
FIG. 2 is an enlargement of a section of FIG. 1. The Figures are schematic and are not to scale.

FIG. 2 shows the exhaust gases 30 which have left the circulating combustion chamber via a flue 31. The exhaust gases enter the first conduit 32 and are quenched from a temperature of between 1500 and 1900° C., usually around 1650° C. to a temperature of between 1300 and 1500° C., normally around 1400° C. by quenching air 33. The first mineral material is introduced into the first conduit 32 via inlet 34 downstream of the second mineral material which is introduced into the first conduit 32 via inlet 35.

The invention claimed is:

1. A method of making a mineral melt, the method comprising the steps of:
providing a circulating combustion chamber and a heat exchange system;
heating mineral material comprising first and second mineral materials;
injecting fuel, the heated mineral material, and combustion gas into the circulating combustion chamber;
combusting the fuel in the circulating combustion chamber, thereby melting the heated mineral material to form a mineral melt and generate exhaust gases;
separating the exhaust gases from the mineral melt, collecting the mineral melt, and passing the exhaust gases to the heat exchange system;
wherein prior to being injected into the circulating combustion chamber, the first and second mineral materials are provided separately to the heat exchange system, and wherein said first mineral material is a raw mineral material and said second mineral material is bonded mineral wool; and wherein the first mineral material has a higher sintering temperature than the second mineral material; and wherein the first mineral material is heated through contact with the exhaust gases before the second mineral material is heated through contact with the exhaust gases and the heated first mineral material.

2. A method according to claim 1, additionally comprising a step of:

flowing the collected mineral melt through an outlet in the circulating combustion chamber to a centrifugal fiberising apparatus to form mineral fibres.

3. A method according to claim 2, wherein the mineral fibres are selected from the group consisting of rock, stone and slag fibres and have a composition, by weight of oxides, comprising below 10% $NaO+K_2O$, above 20% $CaO+MgO$, above 3% iron oxide, and below 50% $SiO_2$.

4. A method according to claim 1, wherein the heated mineral material comprises between 5 and 70% by weight, preferably between 10 and 60% by weight and most preferably between 25 and 50% by weight of the second mineral material.

5. A method according to claim 1, wherein the heat exchange system comprises a first cyclone preheater and a first conduit from the circulating combustion chamber to the first cyclone preheater through which the exhaust gases pass, wherein the method comprises injecting the first and second mineral materials into a first conduit; wherein said injection of the first mineral material into the first conduit is at a position closer to the circulating combustion chamber than said injection of the second mineral material into the first conduit.

6. A method according to claim 5, comprising:

injecting the first mineral material into a second conduit so that the first mineral material undergoes initial heating in a second cyclone preheater prior to being injected into the first conduit.

7. A method according to claim 6, wherein the first mineral material is initially heated in the second cyclone preheater to a temperature in the range of 400-500° C.

8. A method according to claim 1, wherein the exhaust gases are at a temperature in the range of 1300 to 1500° C. at the contact with the first mineral material.

9. A method according to claim 1, wherein, during heating, the second mineral material is heated to a temperature of at least 800° C., preferably 850 to 950° C. through contact with the exhaust gases and the heated first mineral material.

10. The method of claim 1, wherein the bonded wool material is selected from the group consisting of bonded rock fibres, bonded stone fibres, and bonded slag fibres.

11. A method of making a mineral melt, the method comprising the steps of:

providing a circulating combustion chamber and a heat exchange system;

heating mineral material comprising first and second mineral materials;

injecting fuel, the heated mineral material, and combustion gas into the circulating combustion chamber;

combusting the fuel in the circulating combustion chamber, thereby melting the heated mineral material to form a mineral melt and generate exhaust gases;

separating the exhaust gases from the mineral melt, collecting the mineral melt, and passing the exhaust gases to the heat exchange system, wherein the heat exchange system comprises a first cyclone preheater and a first conduit from the circulating combustion chamber to the first cyclone preheater through which the exhaust gases pass;

wherein prior to being injected into the circulating combustion chamber, the first and second mineral materials are provided separately to the heat exchange system, and wherein said first mineral material is a raw mineral material and said second mineral material is bonded mineral wool; and wherein the first mineral material has a higher sintering temperature than the second mineral material; and heating the first mineral material through contact with the exhaust gases; and subsequently heating the second mineral material through contact with the exhaust gases and the heated first mineral material;

wherein the method comprises injecting the first and second mineral materials into a first conduit; wherein said injection of the first mineral material into the first conduit is at a position closer to the circulating combustion chamber than said injection of the second mineral material into the first conduit.

* * * * *